Figure 1:
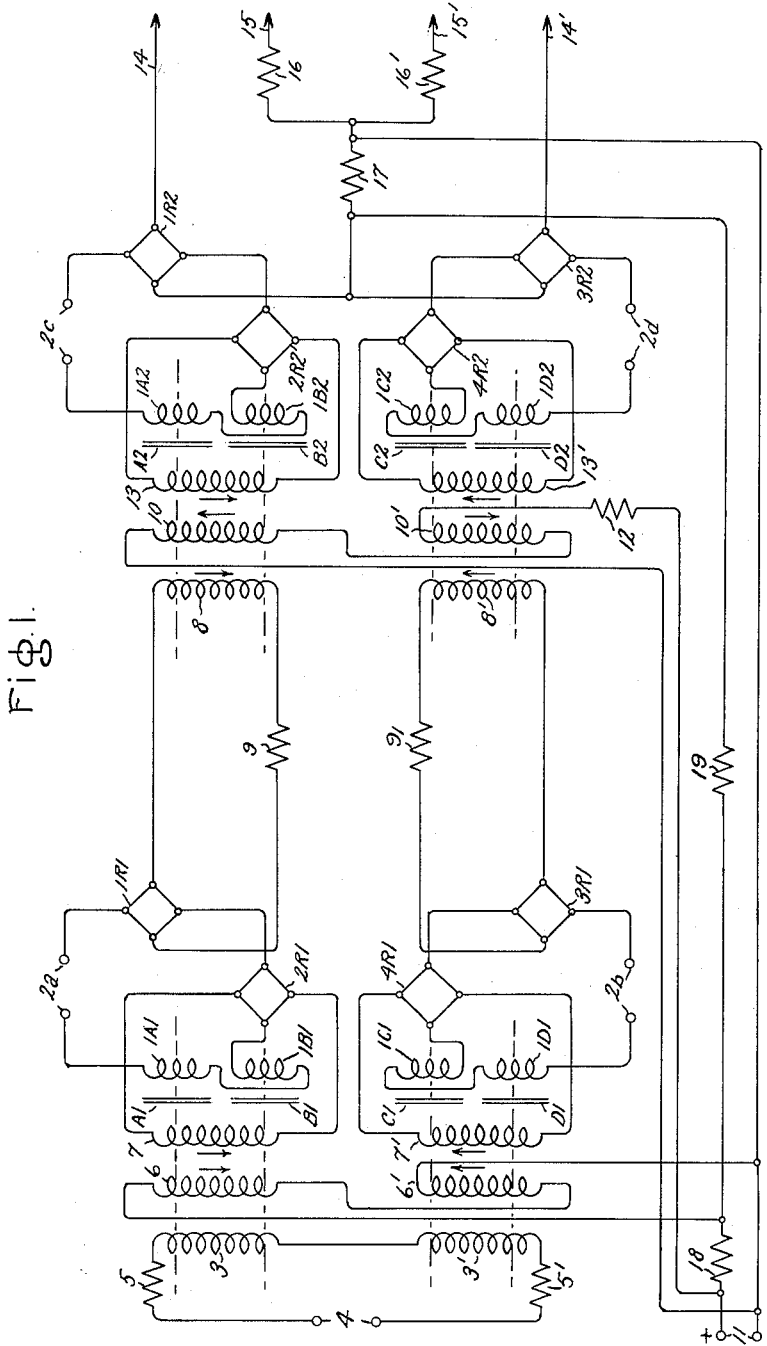

Jan. 10, 1956  F. H. BELSEY  2,730,574
MAGNETIC AMPLIFIER
Filed Aug. 22, 1951  3 Sheets-Sheet 1

Inventor:
Frederick H Belsey,
by *Claude H. Watt*
His Attorney.

Inventor:
Frederick H. Belsey,
by Claude H. Mott
His Attorney.

United States Patent Office 2,730,574
Patented Jan. 10, 1956

2,730,574

MAGNETIC AMPLIFIER

Frederick H. Belsey, Sale, England, assignor to General Electric Company, a corporation of New York Application August 22, 1951, Serial No. 243,062

13 Claims. (Cl. 179—171)

This invention relates to magnetic amplifiers. Magnetic amplifiers, which are commonly known as "transductors," are saturable core reactance devices comprising one or more magnetic circuits having associated therewith a winding or windings for connection in an alternating current circuit and provision for direct current control or input excitation of said core or cores for controlling the saturation effects therein and thereby controlling the output current of the device, that is to say the alternating current flowing in said winding or windings. The magnetic circuit or circuits may be provided with various additional windings or equivalent provision for one or more additional components of direct current excitation whereby desired operating characteristics are obtained.

The alternating current winding usually comprises two parts arranged either on separate magnetic cores or linked with separate limbs of a common magnetic core, such as a three-legged core for example, with the direct current control or input winding having series-connected parts on said two cores, or linked with a third limb of said magnetic core, whereby the fundamental alternating voltages induced in said control winding due to the alternating current in the other windings will neutralize one another and whereby also to obtain symmetry of the positive and negative half-cycles of output alternating current with respect to one another. Furthermore transductors commonly comprise two cores, or pairs of cores as just above set forth, arranged for push-pull operation, that is to say so as to produce opposite effects on the resultant output whereby the latter may be adjustable in either sense according to the energization of the control windings on the several cores. Each core or pair of cores may be provided with direct current biasing ampere turns so that when the input current assists said ampere turns on one core or pair of cores said current will oppose said ampere turns on the other core or pair of cores. For example a separate winding supplied from the output current or voltage or load voltage through a rectifier may be provided for this purpose; a similar result may be achieved by the connection of separate parts of the alternating current winding in circuit with respective rectifiers giving half-wave rectified output current in each winding. The "standing" value of the output currents of the two cores or pairs of cores, namely in the absence of input current, may then be equal to one another to give zero resultant output from the amplifier.

In the application of magnetic amplifiers, the alternating current winding or windings may control the current supplied to a load from an alternating current source by being connected in series between said source and said load, or the amplifier may include interlinked supply and output windings so that the load circuit is electrically isolated from the supply circuit.

The invention relates particularly to magnetic amplifiers comprising at least two stages, the output windings of the first stage of the two being connected through rectifying means with control windings of the second of the two stages so as to control the output currents of said second stage. The invention relates more specifically to magnetic amplifiers of the push-pull type as hereinbefore defined.

Two-stage magnetic amplifiers of the push-pull type are undesirably sensitive to changes in the magnitude of the alternating current supply voltage since a reduction or increase of the supply voltage will cause a reduction or increase in the input currents to the second stage, which reduction or increase will be amplified in the resultant output of the amplifier by said second stage. The provision of positive feedback effect increases this undesired variation of resultant output with variation of supply voltage.

According to the present invention, in order to reduce the effect of changes in the alternating current supply voltage on the output of a magnetic amplifier having at least two stages, one stage is provided with means for producing a feedback component of biasing ampere turns, i. e., a unidirectional signal quantity, proportional to the sum of the output currents of a succeeding stage and acting in the sense to oppose said output currents whereby to tend to maintain the standing value of said output currents at a predetermined value. With this arrangement, for a given value of supply voltage a given input current will produce given values of the output currents of the second stage differing by a given amount from one another to produce a corresponding resultant output effect from the amplifier. Assuming now that the supply voltage falls, then with the arrangement according to the present invention the tendency for the resultant output current to fall is counteracted by the degenerative feedback biasing ampere turns on the first stage, since said feedback, being responsive to the sum of the output currents of the second stage, will fall so as to increase the resultant direct current ampere turns on each core or pair of cores of the first stage and thereby tend to maintain the original values of the corresponding input currents of the second stage. A corresponding stabilizing effect will occur in response to an increase in supply voltage.

Figure 2:
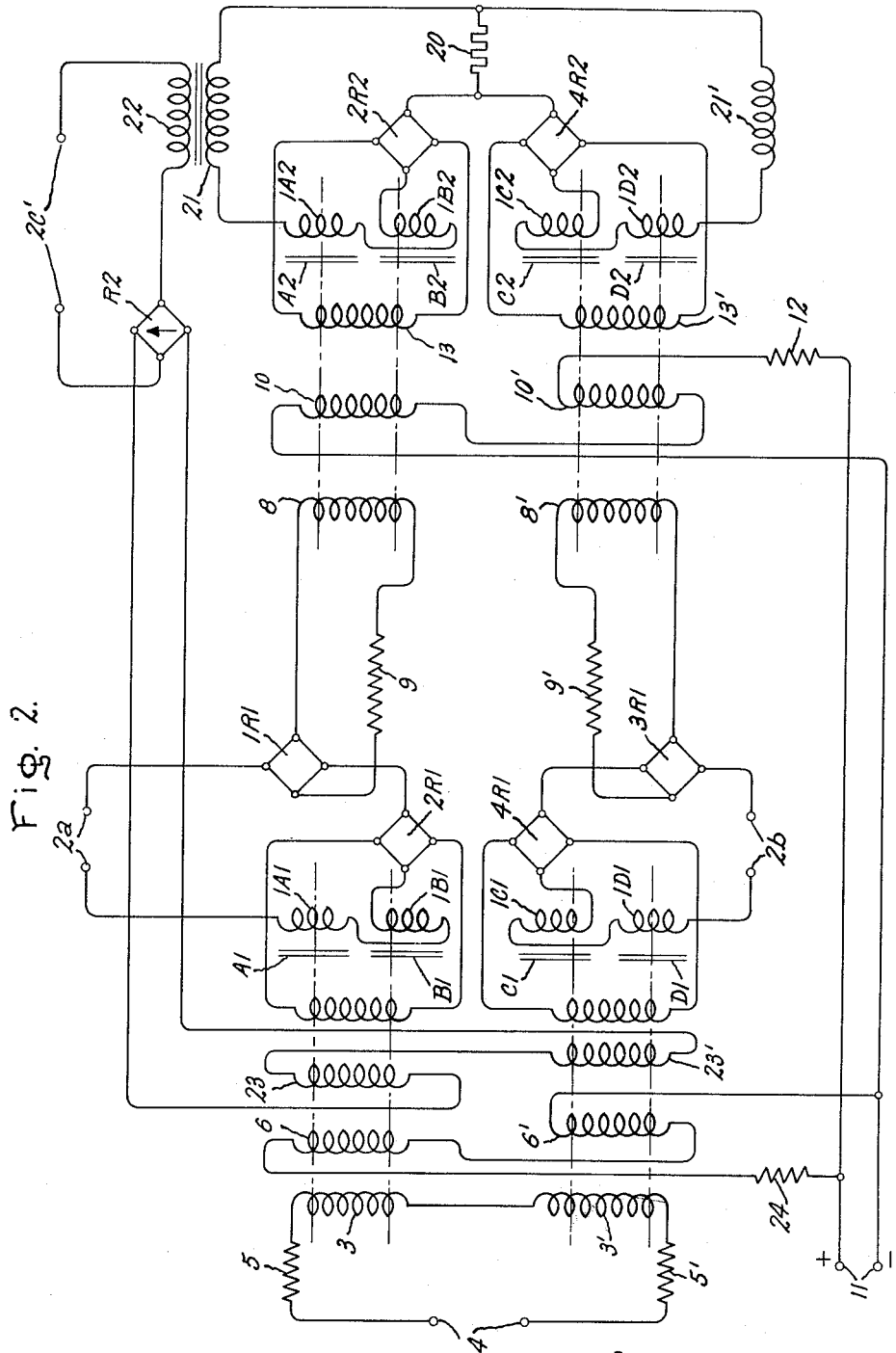
Figure 3:
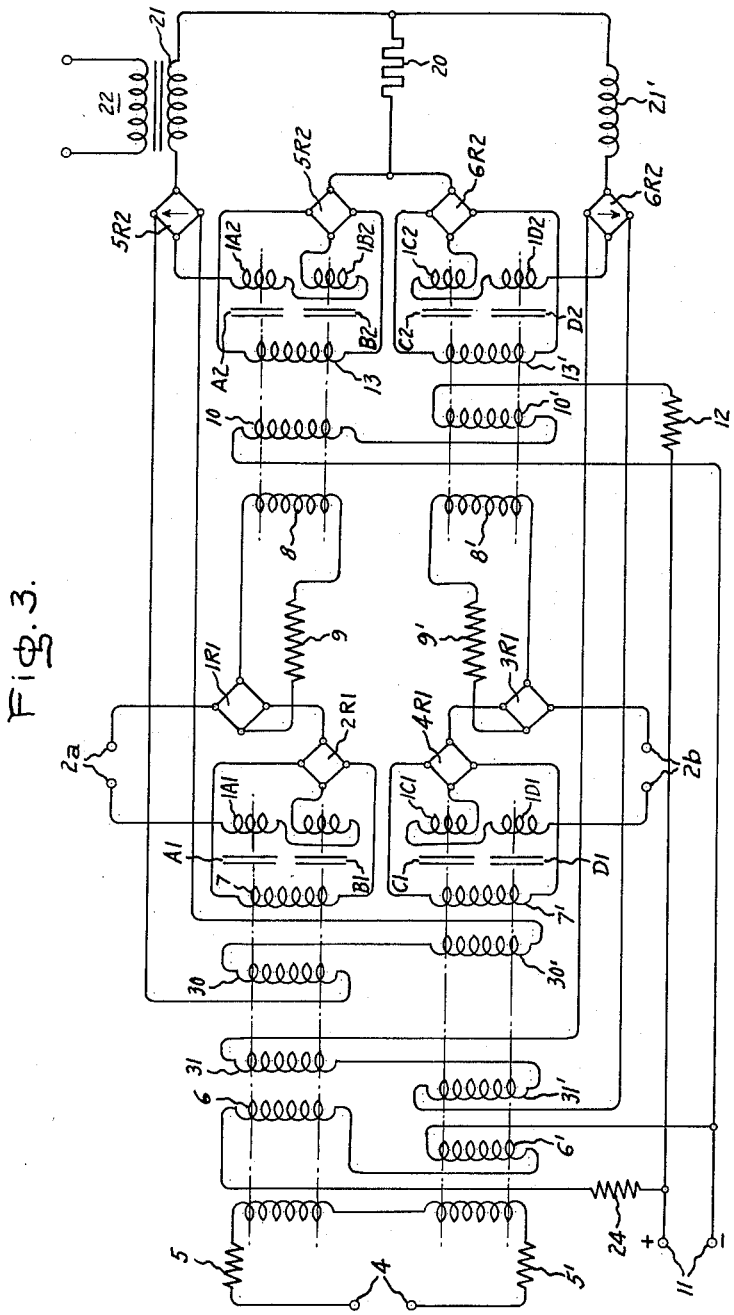

Reference will now be made by way of example to the accompanying drawings in which:

Fig. 1 is an electrical diagram showing two stages of a magnetic amplifier arranged in accordance with one embodiment of the invention, and Figs. 2 and 3 are electrical diagrams illustrating two further embodiments respectively of the invention.

Similar parts in all the figures are indicated by like reference numerals.

In the arrangements illustrated the stages are each assumed to be of the kind comprising two pairs of cores in which the cores of said pair of cores are embraced by a common part of the control, biasing and feedback windings and carry output windings connected in series opposition with one another, so that the alternating voltages induced in each part of the control, biasing and feedback windings by the two parts of the output winding on the associated cores will balance one another. It will be understood, however, that the arrangements illustrated may be applied to other forms of transductors as hereinbefore indicated. For example the cores may carry respectively separate parts of the control, biasing and feedback windings, or each pair of cores may be replaced by a three-limbed core with the control, biasing and feedback windings located on the centre limb and the two parts of the output windings arranged on the outer limbs respectively.

Referring to Fig. 1, the first stage of the magnetic amplifier comprises four cores A1, B1, C1 and D1. These four cores carry respectively the four sections 1A1, 1B1, 1C1 and 1D1 of an output winding. The sections 1A1 and 1B1 are connected in series opposition as just above indicated in a circuit comprising also in series a source of constant voltage alternating current at 2a, a rectifier 1R1 and a second rectifier 2R1, the rectifiers conveniently being of the full-wave dry-plate type. The rectifier 1R1 provides, as will hereinafter be described, for control of the second stage of the amplifier and the second rectifier provides positive feedback operation as will also hereinafter be described. In similar manner the output windings 1C1 and 1D1 are connected in series opposition with one another and in series with a source of constant voltage alternating current at 2b and rectifiers 3R1 and 4R1 corresponding respectively with the rectifiers 1R1 and 2R1. The cores A1 and B1 are linked by a control winding 3, whilst the cores C1 and D1 are linked by a control winding 3'. These control windings are connected in series with one another and a source of control or input voltage at 4. The circuit will usually include limiting resistors 5 and 5'. The cores A1 and B1 are linked by a biasing winding 6 and the cores C1 and D1 by a biasing winding 6', these biasing windings being connected in circuit for energization as will hereinafter be described. A feedback winding 7 linked with the cores A1 and B1 is connected across the output points of the rectifier 2R1, whilst a feedback winding 7' linking the cores C1 and D1 is connected with the output points of the rectifier 4R1.

The second stage of the amplifier similarly comprises four cores A2, B2, C2 and D2, the cores A2 and B2 carrying output windings 1A2 and 1B2 connected in series opposition with one another and in series with rectifiers 1R2 and 2R2 and a source of constant voltage alternating current at 2c; the cores C2 and D2 carry alternating current windings 1C2 and 1D2 connected in series opposition with one another and in series with dry-plate rectifiers 3R2 and 4R2 and a source of constant voltage alternating current at 2d. The cores A2 and B2 are linked by a control winding 8 which is connected across the output points of the rectifier 1R1 of the first stage, whilst the cores C2 and D2 carry a control winding 8' connected across the output points of the rectifier 3R1 of the first stage. Limiting resistors are shown at 9 and 9'. A biasing winding 10 linked with the cores A2 and B2 is connected in series with a biasing winding 10' linked with the cores C2 and D2 for energization from a constant voltage source of biasing current at 11, the circuit including a limiting resistor 12. The cores A2 and B2 are linked by a positive feedback winding 13 connected with the output points of the rectifier 2R2, whilst the cores C2 and D2 are linked by a positive feedback winding 13' connected with the output points of the rectifier 4R2. The biasing windings 10 and 10' act in opposition to the positive feedback windings 13 and 13', whilst the control windings 8 and 8' act in opposition to the biasing windings 10 and 10' on both cores.

The rectifiers 1R2 and 3R2 provide for a direct current output from the second stage, being connected in push-pull relation with one another and with output conductors 14, 15 and 14', 15', usually with limiting resistors as shown at 16 and 16'. The output circuit includes a resistor 17 common to the output currents supplied through both rectifiers 1R2 and 3R2 and employed for deriving feedback to the first stage as will now be described.

The biasing windings 6 and 6' of the first stage are arranged to be supplied with two current components one of which is derived by the connection of said windings with the source 11 through a limiting resistor 18, and the other of which is derived from the resistor 17 through a further limiting resistor 19. The first current component will thus be substantially constant, whilst the second component will be proportional to the sum of the outputs of the second stage of the amplifier. The second component is arranged to act in opposition to the first component.

The operation of the arrangement shown in the figure will first be described without reference to the provision according to the present invention whereby the improvement effected by the invention will be clearly understood. The biasing windings 6, 6' of the first stage, in the absence of the feedback from the second stage, that is to say assuming said winding is connected for energization only from the source 11, will establish predetermined values of standing current in the output windings of the first stage. These currents will be reduced in one output winding of the first stage and corresponding winding of the second stage and increased in the other windings of the two stages upon the application of an input voltage in one sense at 4, the biasing windings 6 and 6' being connected in such directions that the constant component of biasing ampere turns assists the output feedback ampere turns on each pair of cores, whereas the control ampere turns due to the windings 3 and 3' increases the resultant direct current ampere turns on one pair of cores and reduces the direct current ampere turns on the other pair of cores. The corresponding direct output currents of the first stage produce corresponding excitation of the control windings 8 and 8' of the second stage. These control windings act in opposition to the biasing ampere turns due to windings 10 and 10' on both pairs of cores A2, B2 and C2, D2 of said second stage, with corresponding control of the output currents of said second stage. The output current of the rectifiers 1R2 and 3R2 will thus be increased and reduced or vice versa according as the current in the windings 8 and 8' has been increased and reduced and vice versa.

Assuming still that the biasing windings 6, 6' of the first stage are energized only from the constant voltage source at 11, then the output currents of the second stage are subject to large variations in response to variations of the alternating current supply at 2a, 2b, 2c and 2d for the following reasons. For a given value of the input current at 4 to the first stage, the output currents flowing in the windings 8 and 8' will be approximately proportional to the alternating current supply voltage. On each pair of cores of the second stage the input current therefore varies approximately proportionally to the supply voltage, and this variation is amplified in the output currents of the second stage since the resultant output current varies in the same sense as the supply voltage at 2c and 2d and in opposite sense to the effective impedance of the windings 1A2, 1B2 and 1C2, 1D2 which impedance is varied in opposite sense to the supply voltage, due to the variation of current in the control winding 8 or 8' as the case may be in the same sense as the variation of supply voltage at 2a and 2b.

In the arrangement according to the invention, however, the biasing ampere turns produced by windings 6 and 6' on the cores of the first stage include the component dependent on the sum of the output currents of the second stage, namely the current component derived from the resistor 17. This current component acts in opposition to the constant component of ampere turns produced by the connection of the windings 6, 6' with the biasing source at 11. The constant ampere turn component referred to is adjusted by the resistor 18 so that the difference between the current flowing in the biasing winding from the source at 11 and the current flowing in said winding from the resistor 17 will, in the absence of energization of the control winding 3, 3', give the desired standing values of the output currents in the windings 1A1, 1B1 and 1C1, 1D1. The individual magnitudes of the two biasing current components are made large in relation to the change in biasing ampere turns required to vary the standing currents of the second stage from zero to the maximum value, for example ten times said value; the arrangement therefore operates by negative feedback from the sum of the output currents of the second stage to maintain said currents, in the absence of a control signal, at a predetermined percentage of the maximum values of said output current for the maximum input signal, for example 50% of said maximum value. The two stages of the amplifier provide a large amplification between changes in the current windings 6, 6' and the output current of the second stage so that the change in said current necessary to vary the standing currents of the second stage from zero to maximum will in practice be small.

Assuming again that the supply voltage falls, then as above described the output currents of the second stage will both tend to fall, so that the opposing biasing current applied to the first stage windings 6, 6' from the resistor 17 will be reduced on both pairs of cores. The resultant direct current ampere turns on all the cores of the first stage will therefore be increased so that the output currents of both pairs of cores and the currents flowing in windings 8 and 8' will tend to be increased, thereby to tend to maintain the original values of the output currents of the second stage and thereby to tend to maintain a given difference between the values of said output currents for a given current flowing in the control winding 3, 3' in spite of the fall in supply voltage. A corresponding compensation will occur in the case of a rise of supply voltage above the normal value.

It will be understood that the resistors 18 and 19 will be large in relation to the resistance of the windings 6, 6' so that the two current components in said winding will be substantially independent in magnitude of one another.

In a modification of the arrangement above described, in place of the resistor 17 and limiting resistor 19, the windings 6, 6' are connected directly in circuit between resistors 16, 16' and the common conductor between rectifiers 1R2 and 3R2, the number of turns of the biasing winding being selected appropriately, that is to say having regard to the fact that said winding carries the whole of the sum of the output currents of the second stage. The constant component of current in said winding is, with this arrangement, again derived from the source 11 through the limiting resistor 18.

In a further modification, the biasing winding comprises two parts, that is to say one part, for example that illustrated at 6, 6', being connected directly with the constant voltage source at 11, and a further part comprising windings on both pairs of cores A1, B1 and C1, D1 connected for energization directly or otherwise in accordance with the sum of the output currents of the second stage.

Fig. 2 illustrates an amplifier generally similar to that shown in Fig. 1 but arranged for feeding the push-pull output currents to a common alternating current load so that the resultant alternating current flowing in the load is dependent upon the difference between the output currents. In the arrangement of Fig. 2 the alternating current sources at 2c and 2d comprise the two halves 21 and 21' of a centre-tapped secondary winding of a transformer provided for energizing the output stage of the amplifier, the primary winding of this transformer being shown at 22. The alternating current load, shown diagrammatically at 20, is connected between the centre tapping of the secondary sections 21 and 21' on the one hand and similar polarity points of the rectifiers 2R2 and 4R2 on the other hand.

In accordance with this embodiment of the invention there is included in series between the primary winding 22 and the alternating current supply source at 2c' a rectifier R2 the output points of which are connected together through a winding 23 associated with the cores A1 and B1 in series with a winding 23' associated with the cores C1 and D1. The biasing windings 6 and 6' are connected directly with the direct current source at 11 for constant excitation.

The current in the primary winding 22 is proportional to the sum of the currents in the windings 21 and 21' so that the rectified current flowing in the windings 23 and 23' will be proportional to the sum of the output currents of the two parts of the output stage of the amplifier. The windings 23 and 23' are connected with the rectifier R2 in such direction as to oppose the windings 6 and 6' whereby to provide the negative feedback component of biasing ampere turns in dependence on the sum of the output currents of the two parts of the output stage of the amplifier.

In the further modification shown in Fig. 3, a common alternating current load 20 is again connected for energization in accordance with the difference between the output currents of the two parts of the output stage, for example by means of the transformer having windings 21, 21' and 22 as described with references to Fig. 2. In this arrangement a rectifier 5R2 is connected in circuit with the output windings 1A2 and 1B2 and has its output points connected together through a winding 30 associated with the cores A1 and B1 in series with a winding 30' associated with the cores C1 and D. Similarly a rectifier 6R2 is included in series with the output windings 1D2 and 1C2 and the output points of this rectifier are connected together through a winding 31' associated with the cores C1 and D1 in series with a winding 31 associated with the cores A1 and B1. The polarity of the rectifiers 5R2 and 6R2 is such that the windings 30 and 31 both act in opposition to the biasing winding 6, whilst the windings 30' and 31' both act in opposition to the winding 6' whereby the negative feedback component dependent on the sum of the output currents is again produced on the first stage of the amplifier.

The biasing excitation provided on the first stage in accordance with the invention does not adversely affect the sensitivity of the amplifier to the input signals, but has a beneficial effect in this respect since the change in each output circuit is forced to be equal in magnitude to the opposite change in the other output circuit.

What I claim as new and desire to secure by Letters Patent of the United States is:

1. A multi-stage push-pull magnetic amplifier including a plurality of stages each comprising a pair of saturable core reactors coupled in oppositely acting relation and having a plurality of direct current saturating windings and an output winding, said output windings being adapted to be connected to a source of alternating current supply subject to voltage variation, means including a rectifier coupling the output windings of all except the last said pair of reactors to saturating windings of the next succeeding pair of reactors, and means degeneratively coupling the output windings of one said pair of reactors in additive relation to saturating windings of a preceding pair of reactors, thereby to render the current in the output windings of said one pair of reactors substantially independent of variation in the voltage of said alternating current supply source.

2. A multi-stage push-pull magnetic amplifier including a plurality of stages each comprising a pair of saturable core reactors having output windings coupled in oppositely acting relation and a plurality of direct current saturating windings, said output windings being adapted to be connected to a source of alternating current supply subject to voltage variation, means including a rectifier coupling the output windings of all except the last said stage to saturating windings of the next succeeding stage, means including a rectifier coupled to the output windings of one said stage for generating a unidirectional electric signal component proportional to the sum of the currents in the output windings of said one stage, and means utilizing said signal quantity to control saturating windings of a preceding stage to oppose change of current in the output windings of said one stage.

3. A multi-stage push-pull magnetic amplifier including a plurality of stages each comprising a pair of saturable core reactors having output windings coupled in oppositely acting relation and a plurality of direct current saturating windings, said output windings being adapted to be connected to a source of alternating current supply subject to voltage variation, means including a rectifier coupling the output windings of all except the last said stage to saturating windings of the next succeeeding stage, means responsive to the sum of the currents in the output windings of one said stage, and means including a rectifier for degeneratively coupling said last named means to saturating windings of a preceding stage, thereby to render the output currents of said one stage substantially independent of voltage variation of said alternating current supply source.

4. A multi-stage push-pull magnetic amplifier including a plurality of stages each comprising a pair of saturable core reactors having output windings coupled in oppositely acting relation and direct current saturating windings, said output windings being adapted to be connected to a source of alternating current supply subject to voltage variation, means including a rectifier coupling the output windings of all except the last said stage to the saturating windings of the next succeeding stage, a pair of output circuits connected together in oppositely acting relation and including a common coupling resistor, rectifying means connecting said output circuits to the output windings of the last said stage, and means coupling said resistor to the saturating windings of a preceding stage, said means utilizing the voltage drop across said resistor to control the action of the saturating windings of said preceding stage to oppose change of current in said resistor.

5. In a multi-stage magnetic amplifier including a plurality of cascaded, push-pull connected stages each comprising a pair of self-saturable core reactors having output windings coupled in oppositely acting relation and a plurality of direct current saturating windings, said output windings being adapted to be connected to a source of alternating current supply; rectifying means for coupling the output windings of all except the last stage to saturating windings of the next succeeding stage, a biasing source, means responsive ot the sum of output currents in a given stage for generating a signal proportional thereto, and means for controlling the saturation of a stage preceding said given stage in accordance with the difference between said biasing source and said signal, thereby rendering the output currents of said given stage substantially independent of voltage variation in said alternating current supply source.

6. A multi-stage push-pull connected magnetic amplifier including a plurality of cascaded stages each comprising a pair of self-saturable core reactors having output windings connected in oppositely acting relation, and a plurality of direct current saturating windings, said output windings being adapted to be connected to a source of alternating current supply subject to voltage variation; means including a rectifier coupling the output windings of all except the last said stage to saturating windings of a succeeding stage, a transformer having a primary and two secondary windings, said transformer primary being connectable to an alternating current source, and said secondary windings coupled to the output windings of a given stage, means responsive to current flow in said transformer primary winding for generating a signal proportional thereto, a rectifying means employing said signal to control direct current saturating windings of a stage preceding said given stage, thereby rendering the output of said last stage substantially independent of voltage variation of said alternating current supply source.

7. A multi-stage push-pull magnetic amplifier including a plurality of stages each comprising a pair of self-saturable core reactors having output windings coupled in oppositely acting relation, and a plurality of direct current saturating windings, said output windings being adapted to be connected to a source of alternating current supply subject to voltage variation; means including a rectifier coupling the output windings of all except the last said stage to saturating windings of a succeeding stage, means including a rectifier coupling the output winding of a self-saturable reactor of a given stage with a first additional direct current saturating winding of a stage preceding said given stage, means including a rectifier coupling the output winding of the second self-saturable reactor of said given stage with a second additional direct current winding of the stage preceding said given stage, said first and second additional direct current saturating windings being energized in like sense by said coupling means, whereby the output of said multi-stage amplifier is rendered substantially independent of alternating current supply source variation.

8. In a multi-stage magnetic amplifier including a plurality of push-pull connected stages in concatenated relation, means for rendering said amplifier insensitive to variation of the line voltage, said means including a biasing signal source, means for deriving a signal proportional to the sum of the push-pull output of one stage, and means for controlling the saturation of a preceding stage in accordance with the difference of said latter signals.

9. In a multi-stage magnetic amplifier having a plurality of push-pull connected stages in cascaded connection, means responsive to the output of one stage for generating a signal proportional to the sum of the push-pull components thereof, and means for degeneratively directing this signal to control the saturation of a preceding stage, thereby rendering said amplifier substantially insensitive to variation of the line voltage.

10. In a multi-stage magnetic amplifier having a plurality of push-pull connected stages in cascaded connection, means responsive to the output of one stage for generating a signal proportional to the sum of the push-pull components thereof, means for degeneratively feeding back this signal to control the saturation of a preceding stage, a biasing signal source, and means for controlling the saturation of said preceding stage by said biasing signal in opposition to said degenerative feedback signal.

11. In a multi-stage magnetic amplifier including a plurality of push-pull connected stages, means for rendering said amplifier insensitive to variation in the line voltage, said means including means for deriving a first signal proportional to one of the push-pull outputs of a given stage, means for deriving a second signal proportional to the other push-pull output of said stage, and means for degeneratively controlling the saturation of a preceding stage in accordance with the sum of said first and second signals.

12. In a multi-stage magnetic amplifier including a plurality of push-pull connected stages in concatenated relation, each stage having a saturating winding and an alternating current energized output winding, means for rendering said amplifier insensitive to variation of the alternating current voltage energization, said means including a resistor common to the push-pull output windings of one stage to receive the sum of the push-pull output currents therethrough, a biasing signal source, and a signal combining circuit for feeding back a signal proportional to the difference of said summed currents and said bias signal in degenerative relation to a saturating winding of a preceding stage, said combining circuit including a first resistor connecting said summed signal and said saturating winding and a second resistor connecting said biasing signal and said saturating winding.

13. In a multi-stage magnetic amplifier including a plurality of push-pull connected stages in cascaded relation, each stage having a plurality of saturating windings and two alternating current energized output windings in push-pull relation, means for rendering said amplifier insensitive to variation in the alternating current energization, said means including a first rectifier means in one output winding of a given stage for deriving a first direct current signal proportional to one of the push-pull outputs thereof, a second rectifier means in the second output winding of said stage for deriving a second direct current signal proportional to the other push-pull output thereof, means for degeneratively feeding back the first signal to a saturating winding of a preceding stage, and means for degeneratively feeding back the second signal to a different saturating winding of said preceding stage, said first and second signals being fed back in like phase thereby to control the saturation of said preceding stage in accordance with the sum of said push-pull signals.

References Cited in the file of this patent

UNITED STATES PATENTS

| | | |
|---|---|---|
| 2,084,836 | Buschbeck | June 22, 1937 |
| 2,164,383 | Burton | July 4, 1939 |
| 2,464,639 | Fitzgerald | Mar. 15, 1949 |
| 2,503,039 | Glass | Apr. 4, 1950 |
| 2,555,992 | Ogle | June 5, 1951 |
| 2,561,329 | Ahlen | July 24, 1951 |
| 2,629,847 | Eames et al. | Feb. 24, 1953 |

OTHER REFERENCES

Geyger: AIEE, Misc. Paper 50–93, pp. 10, 11, 22, December 1949.

Article by Fitzgerald in "Electrical Communication," December 1950, pp. 298–319.

Geyger: Wissenschaftliche Veröffentlichungen aus den Siemenswerken, vol. XX, 1942, pp. 253–267.